United States Patent [19]

Tanaka et al.

[11] Patent Number: 4,912,494
[45] Date of Patent: Mar. 27, 1990

[54] CAMERA SYSTEM

[75] Inventors: Tsunefumi Tanaka, Kanagawa; Tsunemasa Ohara, Tokyo; Tatsuo Chigira, Kanagawa, all of Japan

[73] Assignee: Canon Kabushiki Kaisha, Tokyo, Japan

[21] Appl. No.: 353,143

[22] Filed: May 2, 1989

Related U.S. Application Data

[63] Continuation of Ser. No. 143,032, Jan. 12, 1988, abandoned.

[30] Foreign Application Priority Data

Jan. 14, 1987 [JP]  Japan .................................. 62-6347

[51] Int. Cl.$^4$ ............................ G03B 3/00; G03B 7/20
[52] U.S. Cl. ...................................... 354/402; 354/286
[58] Field of Search ............... 354/400, 402, 410, 412, 354/455, 195.1, 195.12, 286, 295, 289.1, 289.12

[56] References Cited

U.S. PATENT DOCUMENTS

| 4,548,488 | 10/1985 | Honda et al. | 354/402 |
| 4,671,640 | 6/1987 | Akada et al. | 354/402 |
| 4,728,980 | 3/1988 | Nakamura et al. | 354/402 |
| 4,733,258 | 3/1988 | Kojima | 354/286 |

Primary Examiner—W. B. Perkey
Attorney, Agent, or Firm—Fitzpatrick, Cella, Harper & Scinto

[57] ABSTRACT

A camera system has an interchangeable lens releasably attached to a camera body, an information processing portion provided in the camera body, and another information processing portion provided in the interchangeable lens. The information processing portion of the interchangeable lens discriminates the attachment of photographic supplementary means and communicates with the information processing portion in the camera body to set a photographic condition.

40 Claims, 7 Drawing Sheets

CAMERA SYSTEM

This application is a continuation of application Ser. No. 143,032 filed Jan. 12, 1988, now abandoned.

BACKGROUND OF THE INVENTION:

1. Field of the Invention:

This invention relates to single lens reflex cameras or video cameras of the interchangeable lens type and, more particularly, to a camera system suited to perform an automatic focus adjustment with good efficiency.

2. Description of the Related Art:

Recently, the employment of focus detecting devices of the TTL type in single lens reflex cameras is rapidly spreading. Even a camera having automatic focus adjustment, if of the single lens reflex type at all, is required to have the capability of using photographic supplementary means such as extenders for enlarging the focal length of the photographic lens, reducers for contracting the focal length or like converters, or close-up lenses.

Meanwhile, in order to realize high accuracy of focus adjustment, the focus detecting device repeats a periodic focus detection during the time when the focusing operation (movement of the focusing lens) is controlled in accordance with the preceding detection result. Therefore, the focusing speed and the period of focus detection are in such a precisely-timed relationship that one cycle or a few cycles of detection suffice for realizing a sharp image plane in the depth of detection.

However, suppose a converter of 2× magnification is attached between the photographic lens and the camera body to increase the focal length 2 times, the relation between the defocus amount the camera detects and the amount of focusing movement is caused to change at a rate of the square of the magnification of the converter. If no measure is taken in determining the required amount of movement of the lens, it will result that, as the focusing lens moves the determined distance, the sharp image plane shifts 4 times more than the correct distance. Thus, the sharp image plane overruns the in-focus position, the overdue distance being reflected to a 3 times larger defocus than the previous one. If such driving proceeds, the adjusting action diverges, and a sharp focus becomes eventually impossible to attain. To avoid this, the camera may be provided with means for recognizing electrically or mechanically the presence or absence of a converter to slow down the focusing speed to ¼ of the normal value. Yet, as has been proposed in U.S. patent application Ser. No. 913,343 (Japanese Patent Application No. Sho 60-219521), with a view to a higher accuracy of focusing control, merely accounting for the magification of the converter is not always sufficient. In addition, it is found better that a correction factor concerning the specific performance of the lens is introduced.

Aside from this, the compensation tendency to the aberration correction of the photographic lens and the spectral sensitivity characteristic of the focus detection device in some combinations give rise to a discrepancy between the best focal position for the photographic lens and that determined to be best by the focus detecting device. So, it is preferred to take this information into account when the focusing position is adjusted. Also, vignetting information of the combined lens system, too, must be input in accompaniment with the magnification information of the extender.

FIG. 1 in block form illustrates the flow of signals representative of such correction factors of the focusing speed when an extender is attached. The photographic lens 1, the extender 3 and the camera body 5 have respective units of electrical circuit elements. Information from a memory device 2 such as ROM in the photographic lens 1 and information 4 representative of the use of the extender 3 are supplied to a conversion circuit 6 in the camera body 5, of which the output is applied to a microcomputer (processor) in the focus detecting device 7 where the required values of the correction factors are computed.

However, because some of the information cannot be linearly converted, for all information treated in the camera body, a list of the values of the correction factors of all interchangeable lenses which have so far been available to the camera body and another list of the values of those of all converters usable with the interchangeable lenses should be prepared in the form of a table. Preparing such a table is, however, actually very difficult to do. Moreover, there arises a problem that information pertaining to any interchangeable lenses developed after the purchase of the camera body will not be included in the table as to the technique of communicating between the camera body and the interchangeable lens reference is made to U.S. patent application Ser. Nos. 688,355 and 829,792, now U.S. Pat. No. 4,687,915.

SUMMARY OF THE INVENTION:

A first object of the invention is to eliminate the above-described difficult problems and to facilitate development of a camera system with improvement of the photographic capabilities of the camera.

A second object is to provide for the interchangeable lens with means for recognizing the use of a supplementary photographic member, thereby making it possible to introduce new kinds of interchangeable lenses into an integral camera system.

Yet another object is to provide a camera system in which as the camera body is associated with an objective lens, whilst the camera body is equipped with a processor device, another processor device is located in the interchangeable lens on which device the duty of testing if the values of the correction factors should be altered is borne, the test result is supplied to the processor device in the camera body to permit the correct photographic conditions to be set up.

Figure 1:
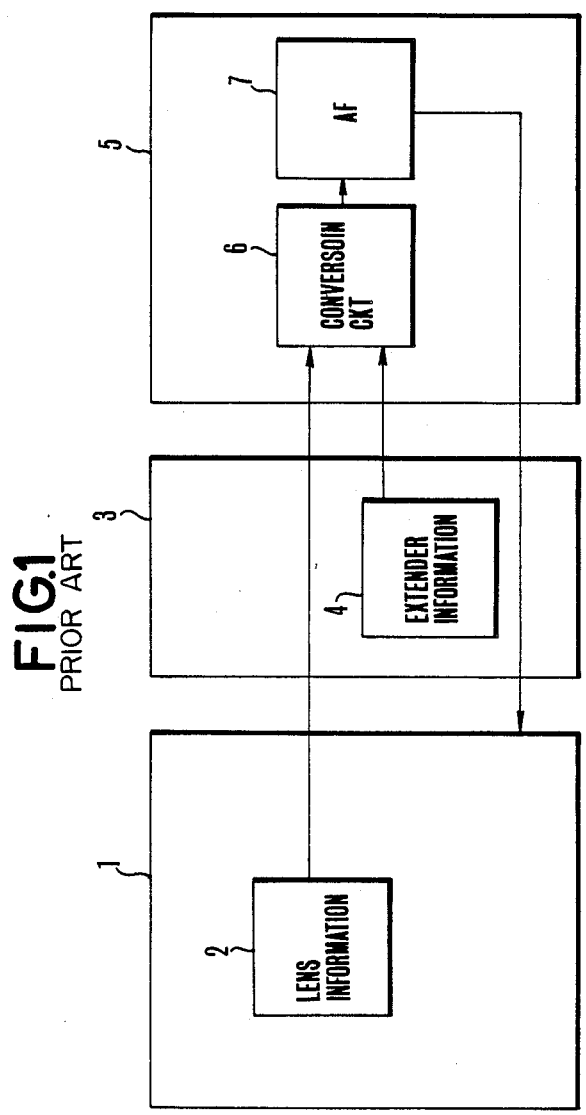
FIG. 1 is a block diagram of the conventional example.
Figure 2:
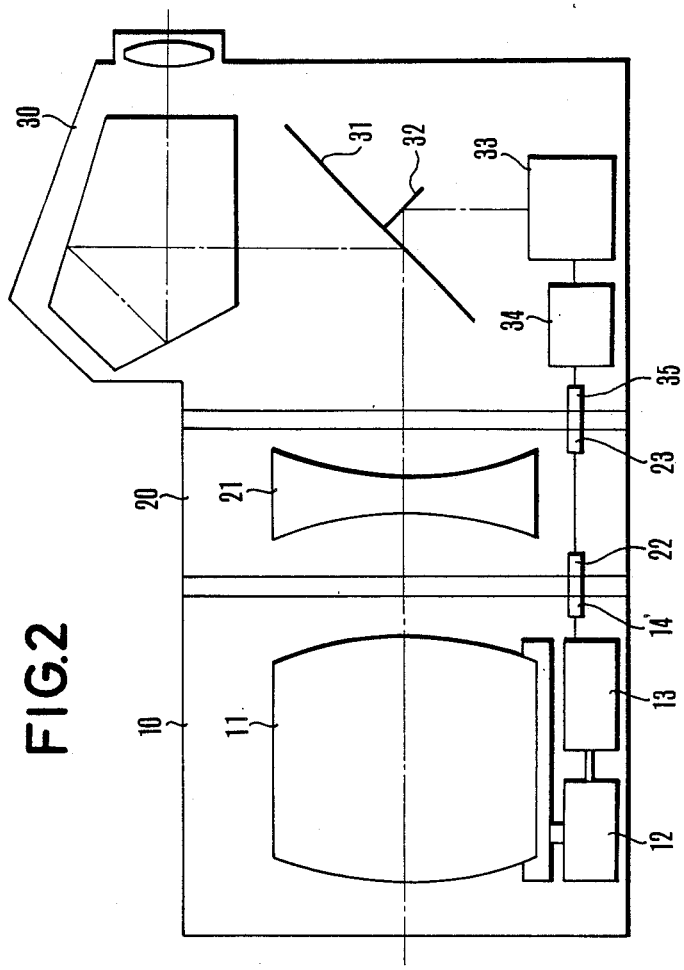
FIG. 2 is a schematic longitudinal section view of an embodiment of the invention.
Figure 3:
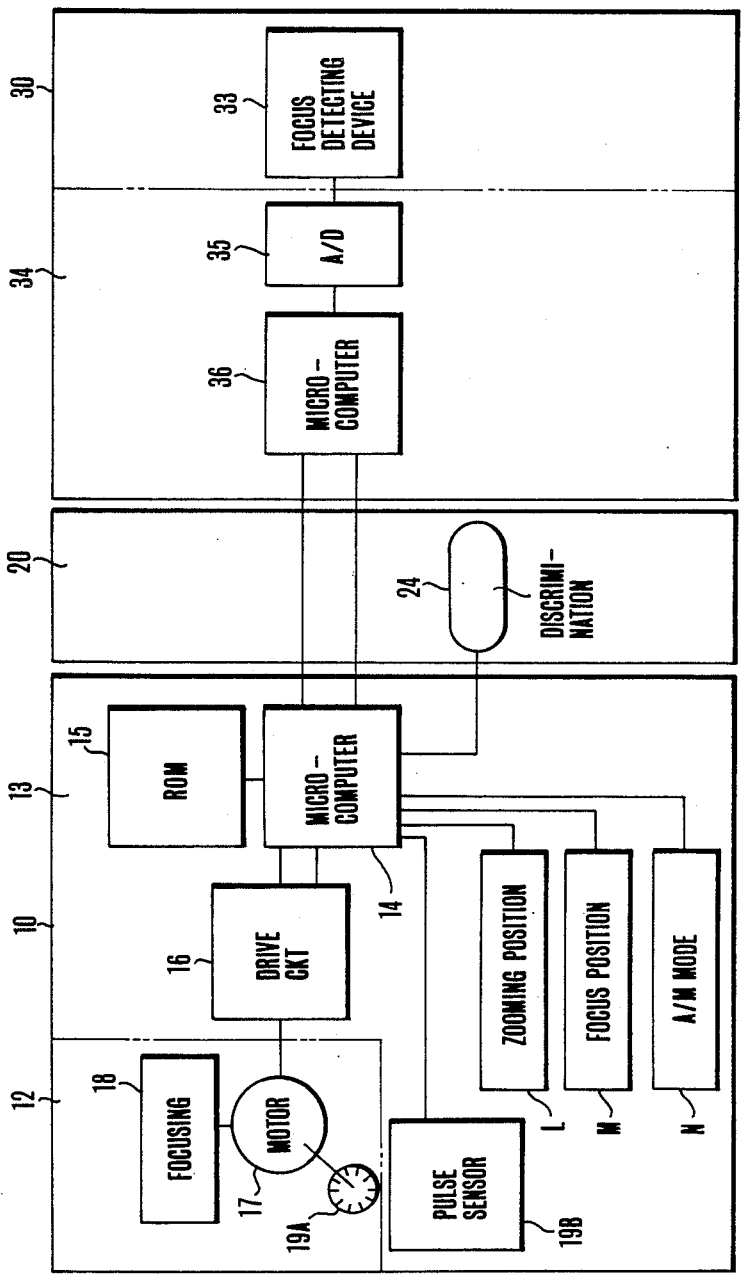
FIG. 3 is a block diagram of an electrical system.

DETAILED DESCRIPTION OF THE PREFERRED EMBODIMENTS:

FIGS. 2 and 3 show one embodiment of the invention. In FIG. 2, a photographic lens barrel 10, an extender barrel 20 and a camera body 30 are releasably coupled with each other in this order by respective bayonet mounts or the like.

For a reducer in replacement of the extender, the same holds. Each lens, though shown as one element, is actually constructed with a plurality of lens elements.

The lens barrel 10 contains a photographic lens 11 and is equipped with an adjusting device 12 for adjusting the focusing position including a drive motor, and an electrical circuit 13. At its rear end there is a contact socket 14'. The focusing is performed by moving the lens either as a whole or in part. The extender barrel 20 contains an extender lens 21 and is equipped with a contact pin 22 at the front end and a contact socket 23 at the rear end. In the camera body 30, a main movable mirror 31 is provided with an auxiliary movable mirror 32, these lying in the illustrated positions when observing, and being retracted from the optical path when exposing film. A focus detecting device 33 is positioned to receive the reflected light from the auxiliary movable lens 32 for focus detecting purposes. The focus detecting device 33 is of the structure well known, and is no more explained here. Reference numeral 34 refers to an electrical circuit; and reference numeral 35 refers to a contact pin.

The pair of the contact pin and the contact socket, though shown only one each in FIG. 2, is actually plural in number for the purpose of signal communication and recognizing the use of the extender as will be more fully described later.

FIG. 3 shows, in block form, the electrical system of the apparatus of FIG. 2. The electrical circuit 13 in the photographic lens barrel 10 includes a microcomputer 14 connected to a memory circuit 15 such as ROM. The memory circuit 15 stores not only information specific to its own lens but also, as necessity arises, information concerning what vignetting takes place when the extender of 2× or 1.4× magnification or the reducer of 0.7× magnification is attached, information concerning the discrepancy between the actual best focus position and the computed one, the responsiveness of the image shift to the movement of the lens, and further the required values of the other correction factors for special lenses.

A drive circuit 16 drives a motor 17 to rotate at a prescribed speed depending on the output of the microcomputer 14. The output shaft of the motor 17 is connected on the one hand to a focusing mechanism for converting rotation to axial movement of the photographic lens and on the other hand to a pulse disc 19A. The pulse disc 19A has radial black and white stripes and rotates, in synchronism, with the rotation of the motor 17. A pulse sensor 19B comprises a light-emitting element and a photosensitive element arranged side by side in a confronting position to the pulse disc 19A so that the reflection of the light from the light-emitting element from the white stripe impinges on the photosensitive element. A pulse signal is produced, being applied to the microcomputer 14. Therefore, the microcomputer 14, the drive circuit 16, the motor 17, the pulse disc 19A and the pulse sensor 19B constitute a feedback system by which the motor is rotated to the indicated direction at the indicated speed by the microcomputer 14.

Further included is a zooming position detector L. If the photographic lens is of the zoom type, for example, the angular position of the actuator ring is sensed to detect the presently set value of the zoom magnification. Also, a focusing position detector M senses the present position of the photographic lens by means of an encoder or the like to grasp the degree of focus. A mode detector N examines a selection switch for the autofocus mode or the manual focus mode and determines which mode is set at the present time.

Meanwhile, in the camera body 30, an analog-to-digital converting circuit 35 is receptive of the signal presenting the adjusted focus state of the photographic lens produced from the focus detecting device 33 for producing a digital output signal. Based on the output of the converting circuit 35, and the information obtained by communicating with the microcomputer 14 in the lens barrel 10, a microcomputer 36 calculates the direction and amount of defocus and gives them to the microcomputer 14 in the lens. From the defocus information, the microcomputer 14 determines the present focusing position and then calculates the direction, amount and speed of rotation of the motor 17, in order to instruct the drive circuit 16.

Discrimination means 24 of the extender barrel 20 enables the microcomputer 14 to recognize that the extender is now in use, or discrimination means 24 produces a signal suited to permit the microcomputer 14 to discriminate between the presence and absence of the extender.

Figure 4:
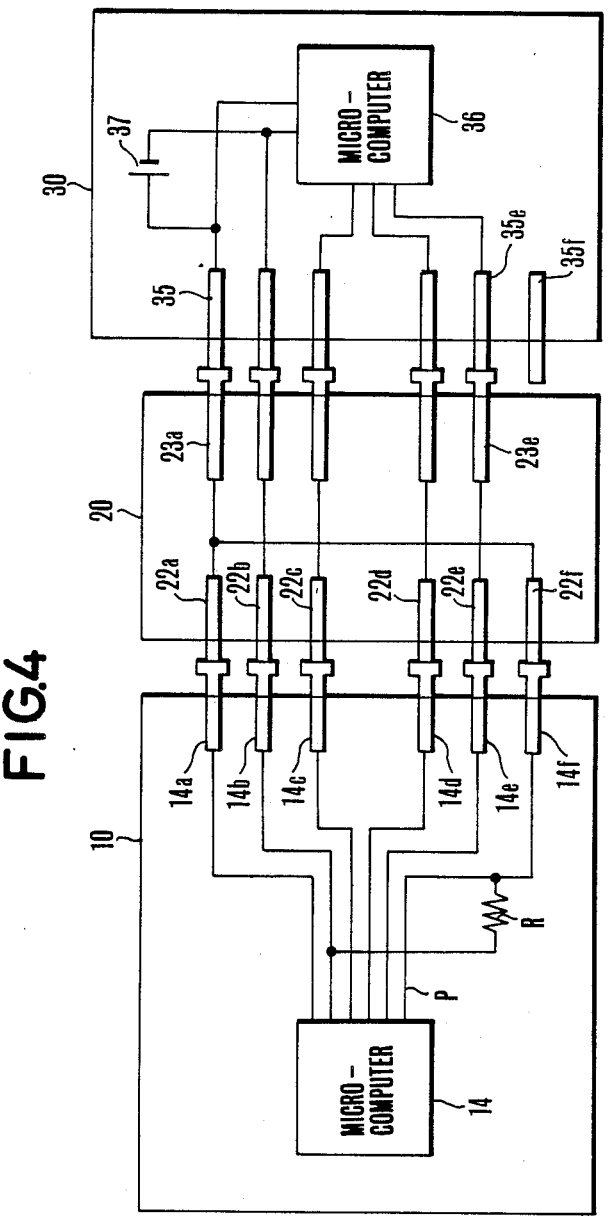
FIG. 4 is a schematic view of the recognition means.

FIG. 4 shows an example of the discrimination means 24. Electric contacts having suffixes "a" to "e" are used for communication between the microcomputers 14 and 36. Meanwhile, an extender recognition terminal P of the microcomputer 14 in the lens is connected to one end of a short-preventing resistor R, the other end of which is connected, within the lens barrel, to the (−) terminal of an electrical power source line. An electrical power source is shown by reference numeral 37. Again, the extender recognition terminal P is connected through an electric contact 14f to a contact 22f which is connected also to the (−) terminal of the electrical power source line.

Therefore, when the extender is attached, the extender recognition terminal P is connected electrically with the (+) terminal of the electrical power source line. Also, suppose the extender is taken out, the contact 14f is connected with the contact 35f of the camera body 30, but the contact 35f has no lead, being open.

By this structure, discrimination can be made in such a way that the recognition terminal P of the microcomputer 14 is at the L level when the extender is attached, or the H level when it is detached. With this arrangement, only one kind of extender can be attached or detached. But, if ROM is used in the extender and means is provided for reading information therefrom, discrimination between a number of kinds of extenders another becomes also possible.

Figure 5:
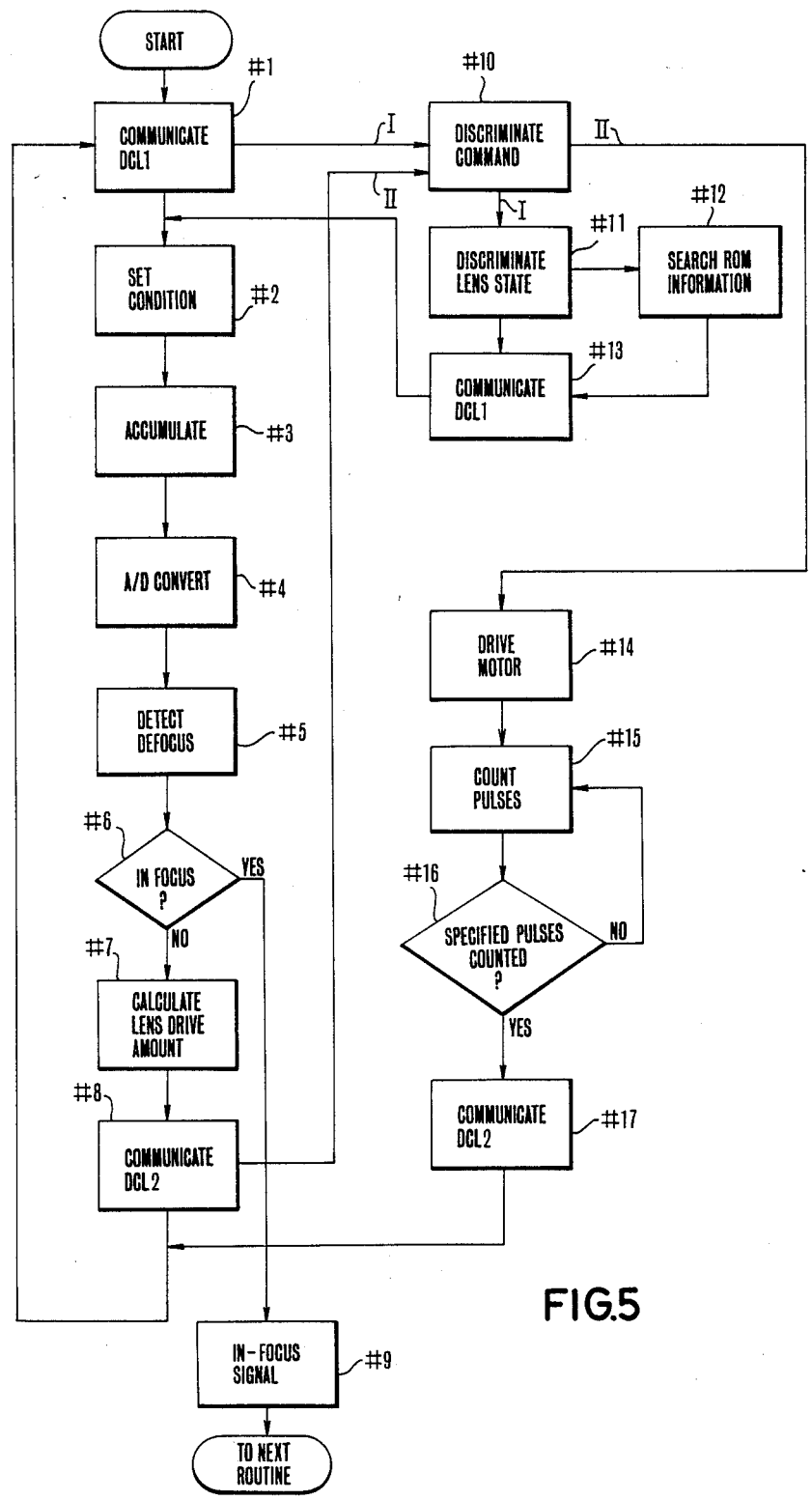
FIG. 5 is a flowchart of the operation of an embodiment of the invention.

Next, the operation is described according to the flowchart of FIG. 5. Steps #1 to #9 are on the camera body side, and steps #10 to #17 on the lens side.

Upon starting, the microcomputer 36 in the camera body communicates with the microcomputer 14 through a channel I (step #1), and command discrimination for commanding discrimination of the attachment of the extender and discrimination of the lens states (step #11) is carried out (step #10). In the lens state discrimination (step #11), the extender attachment is discriminated, the zoom state and focus state are detected, and the ROM 15 is read out.

After, in the ROM information search (step #12), the lens information stored in the ROM 15 have been read, the lens side microcomputer 14 communicates these lens information and zoom and focus information to the camera body side microcomputer 36 (step #13).

The camera body side microcomputer 36 stores these information and sets conditions for activating the focus detecting device 33 (step #2). In the focus detecting device 33, an array of photo-electric elements (not shown) accumulate light information (step #3). Then, the A/D conversion of the output signal of the focus detecting device 33 is carried out (step #4). Then, computing and signal processing are carried out to detect a focus or defocus state (step #5). Here, if it is in focus (step #6), an in-focus signal is produced (step #9), and an exposure mechanism (not shown) is set to expose film.

However, if it is an out-of-focus state (step #6), then the drive amount of the lens is calculated based on the defocus amount (step #7), the speed of movement is determined by taking into account the magnification of the extender, and these results are supplied along with the information of the defocus direction through a channel II to the lens side microcomputer 14 (step #8). The microcomputer 14 issues a command for indicating the driving speed, the corresponding number of pulses to the lens drive amount and the drive direction (step #10), and drives the motor 17 (step #14). The pulse sensor 19B counts pulses (step #15). When a specified number of pulses is reached (step #16), the lens side microcomputer 14 communicates with the camera body side microcomputer 36 that the indicated focus adjustment has ended (step #17). The camera body side microcomputer 36 executes again the in-focus ascertaining process according to the above-described chart, repeatedly until the in-focus state is reached.

Figure 6A:
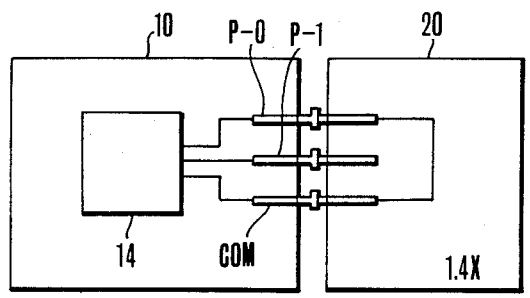
FIGS. 6(a)–6(c) are schematic views of an example of variation of the recognition means.
Figure 6B:
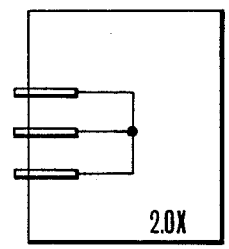
Figure 6C:
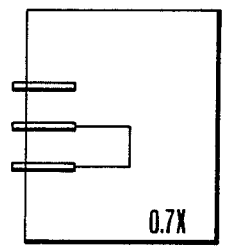

FIGS. 6(a), 6(b) and 6(c) diagrammatically depict discrimination structures for the case where a plurality of converters are attached, for example, extenders of 1.4× and 2× and a reducer of 0.7× magnification.

Here, the discrimination terminal has three contact points assumed to be taken one as common COM, and the other two as ports P-0 and P-1. Then, four different combinations including one with all the contact points out of connection are possible. The discrimination terminal of the microcomputer recognizes the connected electric contact as the H level, and the disconnected one as the L level, being able to discriminate the different kinds of the converters from the order of the H and L levels. For note, in the case when all the contact points are at the L level, the photographic lens is found to be attached directly to the camera body.

The foregoing embodiment has been described with respect to the attachment of a converter having the aim to convert the focal length of the photographic lens. In general when the photographic conditions are changed by the attachment of an accessory as compared with the case of the original photographic lens alone, it is more advantageous to rather than input information directly to the camera side microcomputer to combine the information with the other various information of the photographic lens in a lens side microcomputer or a certain treatment of the information is carried out before it is supplied to the camera side computer. The control of the various functions in the photographic lens barrel is in accordance with the output of the camera side microcomputer wherein the signal included with the previously changed conditions is processed. The present invention demonstrates that a separate microcomputer provided on the lens side is effective to allow effective use of interchangable lens with a camera.

Figure 7:
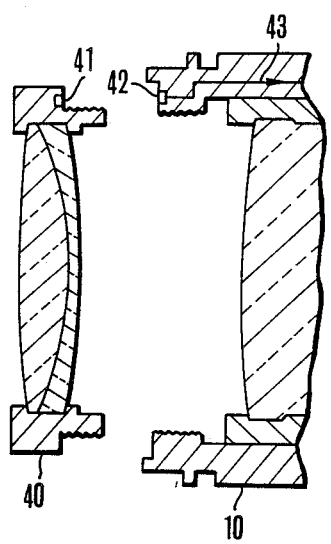
FIG. 7 is a fragmentary section view of another embodiment of the invention.

FIG. 7 depicts a construction feature wherein a closeup lens barrel 40 is attached to the front of the photographic lens barrel 10. On the closeup lens side, for example, an electrically conductive body 41 is buried and arranged to engage with a socket 42 at the front end of a signal line 43 actually comprised of a plurality of lines. When the closeup lens is attached, the microcomputer 14 can recognize the attachment of the closeup lens through the signal line 43. The closeup lens does not aim to convert the focal length of the photographic lens, but the focal length changes dependently. Therefore, when the speed of the lens drive motor incorporated in the photographic lens is determined, the change of the photographic lens by the closeup lens is detected by the microcomputer in the lens. Taking that into account, this microcomputer performs signal processing.

It is understood that the lens information is not limited to the automatic focusing, but refers to the evaluative light metering, program mode selection, strobe information databack information, personal computer communication information, that is, all of that information of the lens which is rather better suited signal processing on the photographic lens side to control the functions of the lens side.

According to the present invention, because all information of the lens is properly converted, in the case when automatic focusing is performed, it can be done better than in the prior art.

Also, in the point of view of a camera system including the camera, the lenses and the accessories, the use of the constructional features of the invention enables each part to advance itself independently. When a better technique is offered, for example, when an improvement of the lens is done, the present camera and accessories can be used as they stand in the advanced system.

What is claimed is:

1. A camera system comprising:
   a camera body;
   a photographic lens attachable to and detachable from said camera body said photographic lens being capable of focusing an image at a focal plane of the camera system;
   photographic supplementary means attachable to and detachable from said photographic lens;
   first information processing means provided in said photographic lens for discriminating the attachment of said photographic supplementary means and for forming information concerning said photographic supplementary means; and
   second information processing means provided in said camera body for communicating with said first signal processing means and for determining a photographic condition on the basis of said information.

2. A camera system according to claim 1, wherein said first information processing means has memory means for storing basic information concerning said photographic supplementary means, said first information processing means using said basic information to form information concerning said photographic supplementary means.

3. A camera system according to claim 2, wherein said first information processing means includes a microcomputer.

4. A camera system according to claim 1, wherein said photographic supplementary means is an optical converter for converting the focal length of said photographic lens.

5. A camera system according to claim 4, wherein said optical converter is an extender.

6. A camera system according to claim 4, wherein said optical converter is a reducer.

7. A camera system according to claim 1, wherein said photographic supplementary is a closeup lens.

8. A camera system according to claim 1, wherein said second information processing means includes focus detecting means for detecting the focus adjustment state by using light passing through said photographic lens and computing means, and said photographic condition refers to the focus adjustment amount.

9. A camera system according to claim 1, further comprising another photographic supplementary means attachable to and detachable from said photographic lens.

10. A camera system according to claim 1, wherein said photographic supplementary means is attached in between said camera body and said photographic lens.

11. A camera system according to claim 1 wherein said first information processing means receives information pertaining to the photographic condition of said second information processing means.

12. A camera system according to claim 1, wherein said photographic lens comprises a lens for focusing and detection means for detecting the position of said focusing lens.

13. A camera system according to claim 1, wherein said information concerning the photographic supplementary means is information concerning a discrepancy between a best focal position and an in-focus position, which is generated when the photographic supplementary means is mounted.

14. A camera system according to claim 1, wherein said information concerning the photographic supplementary means is information pertaining to a sensitivity representing the relationship of an image movement to the lens movement generated when the photographic supplementary means is mounted.

15. A camera according to claim 1, wherein said information concerning the photographic supplementary means is information pertaining to a diaphragm aperture.

16. A camera system according to claim 8 wherein said first information processing means receives information pertaining to the photographic condition of said second information processing means.

17. A photographic lens being capable of focusing an image at a focal plane of a camera, and attachable to and detachable from the camera body of a single lens reflex camera having focus detecting means, and to which a plurality of conversion lenses for converting the focal length having respective recognition means are selectively attached in between it and said camera body, comprising:
sensing means for sensing the recognition means of each of said conversion lenses;
information processing means, electrically connected to said sensing means, for discriminating between the presence and absence of said conversion lens and the kinds of the conversion lenses to form information concerning the attached conversion lenses; and
means for communicating said information to the camera body.

18. A photographic lens according to claim 17, wherein said information processing means has memory means for memorizing basic information concerning each of said conversion lenses.

19. A photographic lens according to claim 17, wherein said information is used to correct the focus adjustment amount owing to said focus detecting means.

20. A photographic lens according to claim 17, wherein the information is information pertaining to the displacement between a best focus position and an in-focus position which is generated when the conversion lens is mounted.

21. A photographic lens according to claim 17, wherein said information is information pertaining to a sensitivity representing the relationship of the image movement to the lens movement which is generated when the conversion lens is mounted.

22. A photographic lens according to claim 17, wherein said information is information pertaining to a diaphragm aperture which is generated when the conversion lens is mounted.

23. A photographic lens according to claim 17, wherein said photographic lens comprises a lens for focusing and detection means for detecting the position of said focusing lens.

24. A conversion lens unit detachably mountable between a camera body having a first information processing circuit for performing electrical information treatment relative to focal detection, said conversion lens unit converting the focal length of an objective lens unit having a second information processing circuit, and comprising:
first communication means for communicating information inherent to said conversion lens unit to said second information processing circuit, and
second communication means for communicating an output treated by said second information processing circuit to said camera body.

25. A conversion lens unit according to claim 24, wherein said conversion lens unit is an extender and the inherent information relates to the magnification of the extender.

26. A conversion lens unit according to claim 24, wherein said first communication means is an electric contact.

27. A camera system comprising:
a camera body,
a photographic lens for forming an image, detachably mountable on said camera body,
photographic supplementary means detachably mountable on said photographic lens,
information transmitting means provided in said photographic lens for discriminating the attachment of said photographic supplementary means and for transmitting information concerning said photographic supplementary means to said camera body,
information processing means provided in said camera body for processing information for determining a photographic condition on the basis of the information transmitted by said information transmitting means, and
means, provided in said camera body, for effecting performance in correspondence to the photographic condition determined by said information processing means.

28. A camera system according to claim 27, further comprising a ROM in said photographic lens, wherein the information concerning the photographic supplementary means is stored in said ROM.

29. A camera system according to claim 27, wherein said information processing means comprises focus detection means for detecting a focus adjustment state by using a light flux passing through the photographic lens, and computation means, and wherein said photographic condition is a focus adjustment amount.

30. A camera system according to claim 29, wherein said means for effecting performance comprises means for moving the lens on the basis of the focal adjustment amount.

31. A camera system according to claim 30, wherein said information concerning the photographic supplementary means is information pertaining to a discrepancy between a best focal position and an in-focus position, which is generated when the photographic supplementary means is mounted.

32. A camera system according to claim 30, wherein said information concerning the photographic supplementary means is information pertaining to sensitivity representing the relationship of an image movement to the lens movement generated when the photographic supplementary means is mounted.

33. A camera system according to claim 30, wherein said information concerning the photographic supplementary means is information pertaining to a diaphragm aperture.

34. A photographic lens detachably mountable on a camera body having means for determining a photographic condition, and selectively attachable with a plurality of conversion lenses having discriminating means, said conversion lenses being inserted between the photographic lens and the camera body to convert a focal length, comprising:

detection means for detecting the discrimination means of each said conversion lenses;

transmitting means electrically connected to said detection means to transmit information corresponding to each of said conversion lenses to the means for determining a photographic condition; and means for receiving the photographic information determination by the determination means.

35. A photographic lens according to claim 34, wherein said photographic condition determining means includes means for detecting a focus adjustment state and computing means, and the photographic information is a focus adjustment amount.

36. A photographic lens according to claim 35, further comprising a movable lens which is moved according to the focal adjustment amount and means for detecting the position of the movable lens.

37. A photographic lens according to claim 36, further comprising a motor for driving the movable lens.

38. A photographic lens according to claim 35, wherein the information corresponding to each of said conversion lens is information pertaining to a discrepancy between a best focal position and an in-focus judging position, which is generated when the conversion lens is mounted.

39. A photographic lens according to claim 35, wherein said information corresponding to each of the conversion lenses is information pertaining to sensitivity representing the relationship of an image movement to a lens movement, which is generated when the conversion lens is mounted.

40. A photographic lens according to claim 35, wherein said information corresponding to each of the conversion lenses is information pertaining to sensitivity representing the relationship of an image movement to a lens movement, which is generated when the conversion lens is mounted.

* * * * *

UNITED STATES PATENT AND TRADEMARK OFFICE
CERTIFICATE OF CORRECTION

PATENT NO. : 4,912,494

DATED : March 27, 1990

INVENTOR(S) : Tanaka, et al.

It is certified that error appears in the above-identified patent and that said Letters Patent is hereby corrected as shown below:

COLUMN 1: Line 7 and column 2, line 30;

Change "INVENTION:" to --INVENTION--.

COLUMN 2: Line 50;

Change "DRAWINGS:" to --DRAWINGS--.
Line 65;
Change "EMBODIMENTS:" to --EMBODIMENTS--.

Line 24, change "as" to --. As--.

COLUMN 5:

Line 53, change "general" to --general,--.

COLUMN 6:

Line 42, change "body said" to --body, said--.

COLUMN 7:

Line 8, change "supplementary" to --supplementary means--.

UNITED STATES PATENT AND TRADEMARK OFFICE
CERTIFICATE OF CORRECTION

PATENT NO. : 4,912,494

DATED : March 27, 1990

INVENTOR(S) : Tanaka, et al.

It is certified that error appears in the above-identified patent and that said Letters Patent is hereby corrected as shown below:

COLUMN 9:

Line 37, change "each said" to --each of said--.

COLUMN 10:

Line 7, change "determination" (first occurrence) to --determined--.

Line 21, change "lens" to --lenses--.

Signed and Sealed this

Twelfth Day of May, 1992

Attest:

DOUGLAS B. COMER

*Attesting Officer*   *Acting Commissioner of Patents and Trademarks*